(12) United States Patent
Grow

(10) Patent No.: US 8,176,505 B2
(45) Date of Patent: May 8, 2012

(54) METHOD OF MANIPULATING DATA STORAGE ELEMENTS

(75) Inventor: Roger H. Grow, Lafayette, CO (US)

(73) Assignee: Oracle America, Inc., Redwood City, CA (US)

( * ) Notice: Subject to any disclaimer, the term of this patent is extended or adjusted under 35 U.S.C. 154(b) by 11 days.

(21) Appl. No.: 12/717,478

(22) Filed: Mar. 4, 2010

(65) Prior Publication Data

US 2010/0165506 A1    Jul. 1, 2010

Related U.S. Application Data

(62) Division of application No. 11/181,125, filed on Jul. 14, 2005, now Pat. No. 7,707,596.

(51) Int. Cl.
  *G11B 17/04* (2006.01)
  *G11B 21/08* (2006.01)
  *G11B 7/085* (2006.01)

(52) U.S. Cl. .................. 720/620; 369/30.43; 369/30.55

(58) Field of Classification Search .... 369/30.43–30.45, 369/30.55–30.57; 720/620–623
See application file for complete search history.

(56) References Cited

U.S. PATENT DOCUMENTS

| | | | |
|---|---|---|---|
| 4,607,354 A | 8/1986 | Ishibashi et al. | |
| 4,864,511 A | 9/1989 | Moy et al. | |
| 4,928,245 A | 5/1990 | Moy et al. | |
| 4,937,690 A | 6/1990 | Yamashita et al. | |
| 5,123,000 A * | 6/1992 | Fitzgerald et al. | 369/30.43 |
| 5,226,779 A * | 7/1993 | Yeakley | 414/753.1 |
| 5,388,946 A | 2/1995 | Baur | |
| 5,418,664 A * | 5/1995 | Ostwald | 360/92.1 |
| 5,421,697 A * | 6/1995 | Ostwald | 414/753.1 |
| 5,471,561 A | 11/1995 | Cowgill et al. | |
| 5,479,581 A | 12/1995 | Kleinschnitz | |
| 5,502,697 A | 3/1996 | Taki | |
| 5,546,315 A | 8/1996 | Kleinschnitz | |
| 5,601,882 A * | 2/1997 | Augier et al. | 427/513 |
| 5,610,882 A | 3/1997 | Dang | |
| 5,647,717 A | 7/1997 | Yokogawa et al. | |
| 5,818,802 A * | 10/1998 | Menke et al. | 369/30.55 |
| 6,059,509 A | 5/2000 | Ostwald | |
| 6,064,544 A * | 5/2000 | Wada | 360/92.1 |
| 6,219,313 B1 | 4/2001 | Ries et al. | |
| 6,314,338 B1 | 11/2001 | Billington | |
| 6,710,962 B1 | 3/2004 | Caverly et al. | |
| 6,781,789 B2 | 8/2004 | Ostwald | |
| 2001/0040757 A1 | 11/2001 | Iwabushi | |
| 2003/0040836 A1 | 2/2003 | Deckers | |
| 2003/0063411 A1 * | 4/2003 | Ostwald | 360/92 |
| 2004/0165309 A1 | 8/2004 | Deckers | |
| 2004/0179293 A1 * | 9/2004 | Collins et al. | 360/92 |
| 2004/0240097 A1 | 12/2004 | Evans | |
| 2005/0015179 A1 | 1/2005 | Dickey et al. | |
| 2006/0005217 A1 * | 1/2006 | Leonhardt et al. | 720/725 |

* cited by examiner

*Primary Examiner* — Daniell L Negron
*Assistant Examiner* — Adam B Dravininkas
(74) *Attorney, Agent, or Firm* — Brooks Kushman P.C.

(57) ABSTRACT

A device and method for simultaneously manipulating multiple data storage cartridges or other storage elements in a storage library. The device housing includes an opening for receiving data storage cartridges. A gripping mechanism extends from the opening. The gripping mechanism is adapted to grip a data storage cartridge to be retrieved and to urge the data storage cartridge into the opening. One or more transport mechanisms are attached to one or more inner walls of the housing. The transport mechanisms are adapted such that once a data storage cartridge moves into the opening, the transport mechanisms will urge the data storage cartridge further into the opening until the data storage cartridge is held within the housing. The data storage cartridge can be moved further into the housing such that the gripping mechanism is free to collect additional cartridges.

18 Claims, 4 Drawing Sheets

METHOD OF MANIPULATING DATA STORAGE ELEMENTS

CROSS-REFERENCE TO RELATED APPLICATIONS

This application is a divisional of U.S. application Ser. No. 11/181,125 filed on Jul. 14, 2005, which is hereby incorporated by reference in its entirety.

BACKGROUND

1. Field of the Disclosure

The present disclosure relates generally to methods for manipulating data storage elements in a library of data storage elements.

2. Background Art

Modern data storage libraries may contain vast numbers of data storage cartridges other storage elements, such as floppy disks, DVDs, CDs. To handle the vast number of cartridges or other storage elements, one or more robotic devices having a manipulating member, which may be referred to as a hands, move within the library. The robots and associated hands retrieve data storage cartridges from the library and deliver the data storage cartridges to one or more data storage cartridge readers. Similarly, the robots and associated hands deliver data storage cartridges from the readers back to the library.

Because the number of data storage cartridges contained in a library can be extremely large, efficient use of space is a priority. Thus, data storage cartridges are packed closely together and the library is designed such that there exists a minimum number of aisles of mostly empty space. Aisles may be horizontal and vertical, or curved. Although aisles are necessary to allow the robots and hands to retrieve data storage cartridges, each aisle reduces the total number of data storage cartridges that may be stored in a particular room.

Reducing the number of aisles and increasing the number of data storage cartridges stored in a library is desirable. Therefore, it would be advantageous to have an improved apparatus and method for manipulating multiple data storage cartridges using a single robot having a single hand.

SUMMARY

A method according to the present disclosure of manipulating a data storage element may comprise gripping the data storage element, while the data storage element is disposed in a storage compartment, using a gripping mechanism that extends from an opening in a housing, wherein the gripping mechanism is operably attached to the housing, and wherein the housing is sized to hold a plurality of data storage elements. The method may further include moving the data storage element away from the storage compartment and into the opening using the gripping mechanism, and moving the data storage element away from the gripping mechanism and further into the housing through the opening using a first transport mechanism, the first transport mechanism being disposed within and operably connected to the housing.

DETAILED DESCRIPTION

Figure 1:
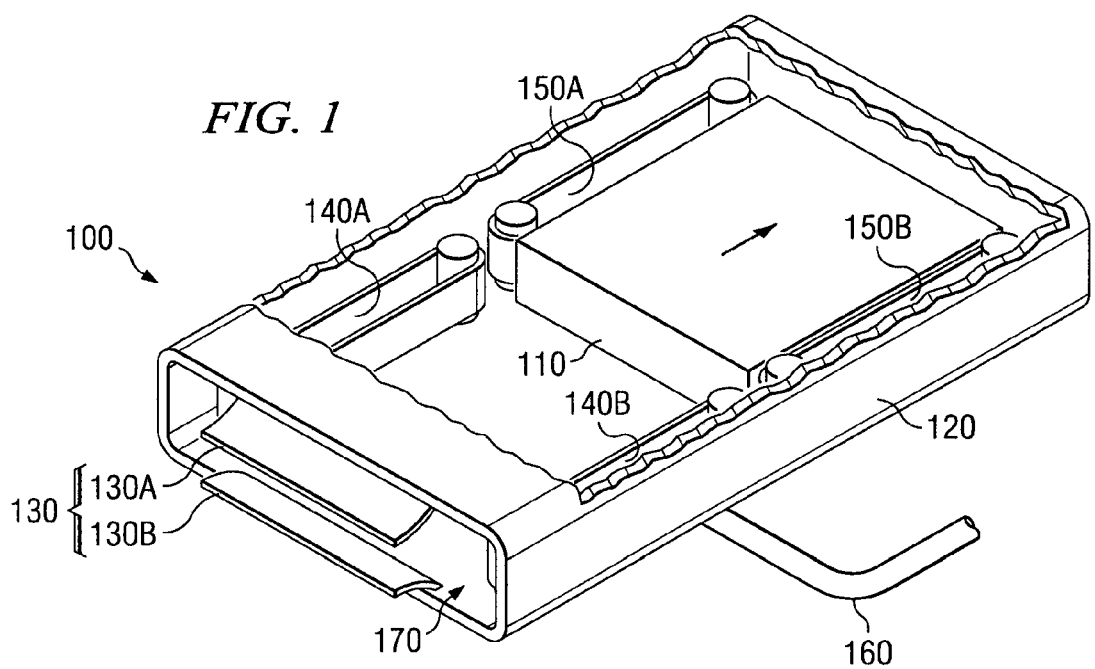
FIG. 1 shows a device for manipulating multiple data storage cartridges in accordance with a preferred embodiment of the present invention.

With reference now to the figures and in particular with reference to FIG. 1, a device for manipulating multiple data storage cartridges or other storage elements in a storage library is shown in accordance with an embodiment of the present invention. A device for manipulating data storage cartridges may be referred to as a hand. Hand 100 includes a shell, such as housing 120, that holds a data storage cartridge, such as data storage cartridge 110.

Gripping mechanism 130 extends out from opening 170 in housing 120 to engage the front of data storage cartridge 110. Gripping mechanism 130 then retracts to pull data storage cartridge 110 partially into housing 120. Transport mechanisms then pull data storage cartridge 110 further into housing 120. Later, when cartridge 110 is ejected from housing 120, the transport mechanisms may reverse their action and aid in ejecting cartridge 110 from housing 120.

The transport mechanisms shown in the illustrative embodiments of FIG. 1 through FIG. 6C are belts. The belts may be GATES™ POWERGRIP™ belts, though any pliable belts fashioned from rubber, plastic, or other flexible material may be used. In an illustrative embodiment, the belts have teeth disposed on one side of the belt. The teeth are sized, dimensioned, and spaced to correspond with sprockets disposed in rollers that drive the belt. One or more motors are connected to the rollers in order to cause the rollers to roll and thereby induce the belt to rotate around the rollers. The belt catches against the side or sides of a tape cartridge, thereby providing the force required to pull or push the data storage cartridge within the housing. The belt may also be replaced by a track or tread, similar in structure to tank treads.

In addition, the transport mechanisms may be any other suitable mechanisms for pulling or pushing data storage cartridges within the housing. For example, the transport mechanism may be a series of powered and freewheeling rollers disposed on opposite inner walls of the housing. One or more motors cause the rollers to spin, and the rollers catch against the side or sides of a tape cartridge, thereby providing the force required to pull or push the data storage cartridge within the housing. In another illustrative embodiment, the transport mechanism may be electromagnetic. In this case, an electromagnetic force is used to pull and push the data storage cartridge within the housing. However, the data storage cartridge must be shielded to prevent magnetic fields from damaging data held in one or more tapes contained within the cartridge. In yet another illustrative embodiment, the transport mechanism may be a series of levers that grip the data storage cartridge and pull or push it within the data storage cartridge. In yet another illustrative embodiment, the transport mechanism may be one or more rods adapted with a mechanism that attaches to the data storage cartridge. The rods move inwardly and outwardly relative to the opening in the housing. The rods may be connected to the data storage cartridges and thereafter used to pull and push data storage cartridges within the housing.

As described above, the illustrative transport mechanisms shown in FIG. 1 through FIG. 6C are belts driven by rollers. Primary transport mechanism set 140A and 140B retracts data storage cartridge 110 into housing 120 along the major axis of the housing. If data storage cartridge 110 is the first cartridge in housing 120, then secondary transport mechanism set 150A and 150B engages data storage cartridge 110 and pulls data storage cartridge 110 to the rear of housing 120 as primary transport mechanism set 140A and 140B urges data storage cartridge 110 towards the rear of housing 120. Power source 160 drives the automatic action of both primary transport mechanism set 140A and 140B and secondary transport mechanism set 150A and 150B.

Gripping mechanism 130 extends from opening 170 of housing 120. In the present embodiment, gripping mechanism 130 includes two resilient fingers, flaps or tongs, tong 130A and tong 130B, attached to housing 120 and extending from opening 170. Gripping mechanism 130 reciprocates in and out of housing 120, thereby allowing tongs 130A and 130B to grab cartridge 110 and retract cartridge 110 into housing 120.

Gripping mechanism 130 may later be used to move data storage cartridge 110 back out of housing 120. For example, the operation of primary transport mechanism set 140A and 140B and secondary transport mechanism set 150A and 150B may be reversed such that the transport mechanism sets urge data storage cartridge 110 out of opening 170. Once data storage cartridge 110 is completely out of housing 120, gripping mechanism 130 holds data storage cartridge 110 until it is placed into a reader or a library storage slot, as desired.

Figure 2:
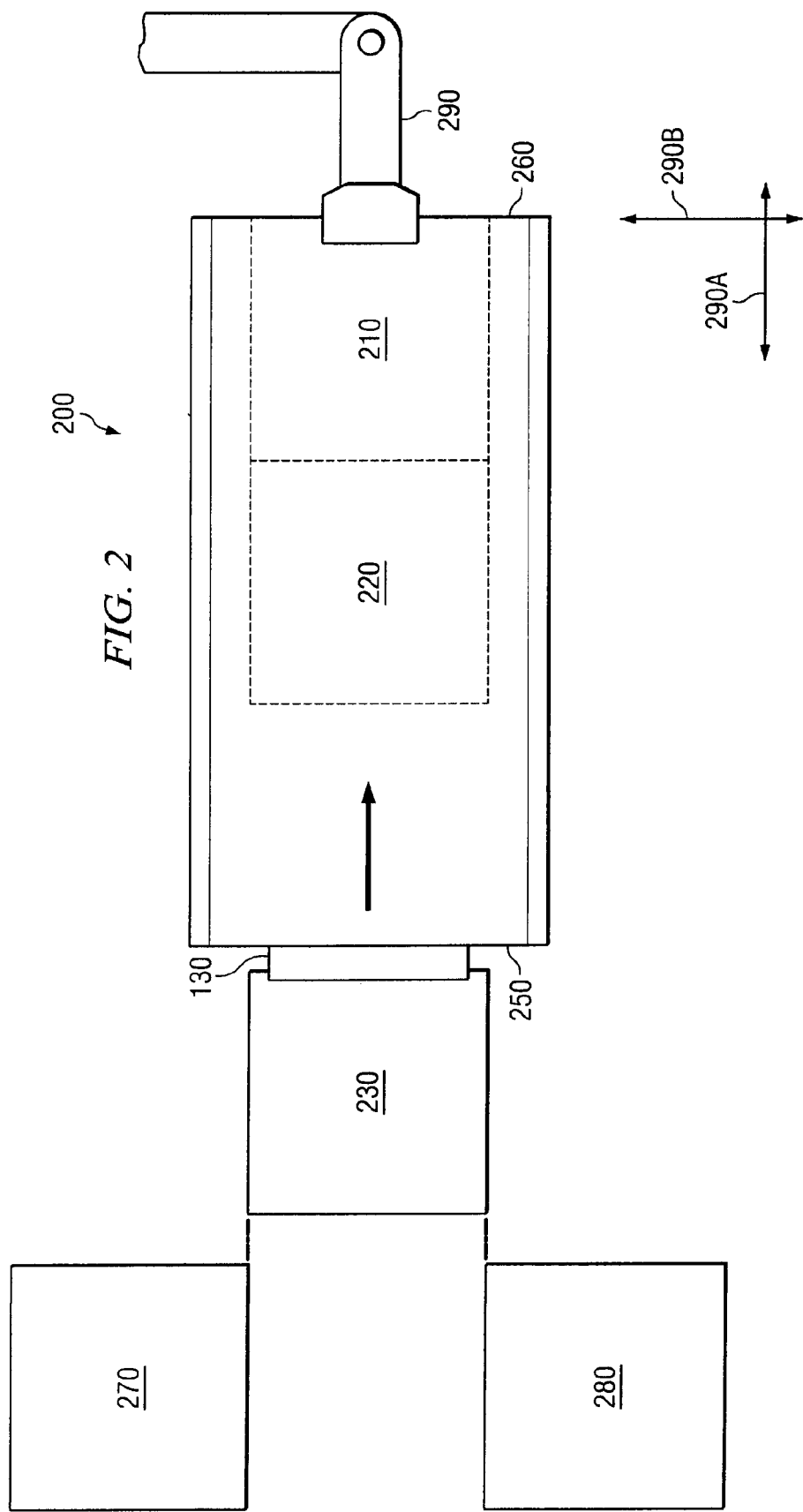
FIG. 2 shows a cross section of a device for manipulating multiple data storage cartridges in accordance with a preferred embodiment of the present invention.

FIG. 2 shows a device for manipulating multiple data storage cartridges in accordance with a preferred embodiment of the present invention. FIG. 2 illustrates an exemplary operation of the device shown in FIG. 1. Hand 200 is a larger version of hand 100 shown in FIG. 1, allowing for three data storage cartridges. However, a hand may be designed to hold any desired number of data storage cartridges, subject to practical size considerations of aisles in the library or the size of considerations of the room containing the library.

In the illustrative embodiment, robot 290 maneuvers hand 200 to a designated area in the library storage area. Robot 290 is connected to the housing. The robot is adapted to move in and around the data storage library and is further adapted to manipulate the orientation of hand 200 in order to manipulate data storage cartridges. In the illustrative embodiment, robot 290 is adapted to manipulate hand 200 such that the opening in hand 200 aligns with a data storage cartridge to be retrieved, such as data storage cartridge 230. Hand 200 may be adapted for use with any suitable robot, including robotic arms and robotic rail systems.

Once robot 290 has maneuvered hand 200 into a desired area in the library, hand 200 is ready to manipulate one or more data storage cartridges. Hand 200 grabs data storage cartridge 230, which is stored between data storage cartridges 270 and 280 in the library. Hand 200 uses gripping mechanism 130 to grip data storage cartridge 230 from its initial library storage location. Transport mechanism sets, shown in FIG. 1, then move data storage cartridge 230 from an opening in the "front" 250 of hand 200 to the next available spot within hand 200. In this illustrative embodiment, the next available spot is adjacent to data storage cartridge 220. If data storage cartridge 230 had been the first data storage cartridge in hand 200, then transport mechanism sets within hand 200 would have moved cartridge 230 to the "rear" 260 of hand 200, where data storage cartridge 210 is shown.

Data storage cartridges 210, 220, and 230 are ejected in reverse order relative to their respective new locations. For example, robot 290 moves hand 200 to a new library cartridge location and cartridge 230 moves out of the opening in front 250 of hand 200. Gripping mechanism 130 aids in guiding and placing cartridge 230 into its new location. After cartridge 230 is put into place, robot 290 then maneuvers to another location intended for cartridge 220 and the same process is repeated for ejecting cartridge 220. The same process is then repeated for cartridge 210.

Hand 200 may retrieve and eject cartridges in any particular order. For example, hand 200 may retrieve data storage cartridge 210, retrieve data storage cartridge 220, eject data storage cartridge 220, retrieve data storage cartridge 230, eject data storage cartridge 230, and then finally eject data storage cartridge 210.

In addition, hand 200 may be expanded such that hand 200 may be sized and dimensioned to hold a three dimensional array of data storage cartridges. In the illustrative example shown in FIG. 2, cartridges are stored sequentially along long axis 290a of hand 200. Additional transport mechanisms may be provided to manipulate cartridges along different axes within hand 200. For example, an additional set of transport mechanisms along the top and bottom of hand 200 may be provided such that cartridge 210 may be moved along minor axis 290b of hand 200. Minor axis 290b is perpendicular to and in the same plane as long axis 290a. Thus, hand 200 may accommodate more data storage cartridges by pushing data storage cartridges 210 and 220 aside along minor axis 290b. Furthermore, in this illustrative embodiment, data cartridges may be ejected in any desired order, thereby allowing for access to data storage cartridges in any desired order.

In another example, assuming space is provided in hand 200, additional transport mechanism sets may be provided to move data storage cartridges along a third, vertical axis. The vertical axis is perpendicular to both long axis 290a and minor axis 290b. Thus, cartridge 210 may be pushed up or down within hand 200. In yet another example, hand 200 may contain multiple sets of transport mechanisms or other actuators that allow a cartridge to be stored in a cell within a three dimensional array of cells disposed within hand 200.

Figure 3:
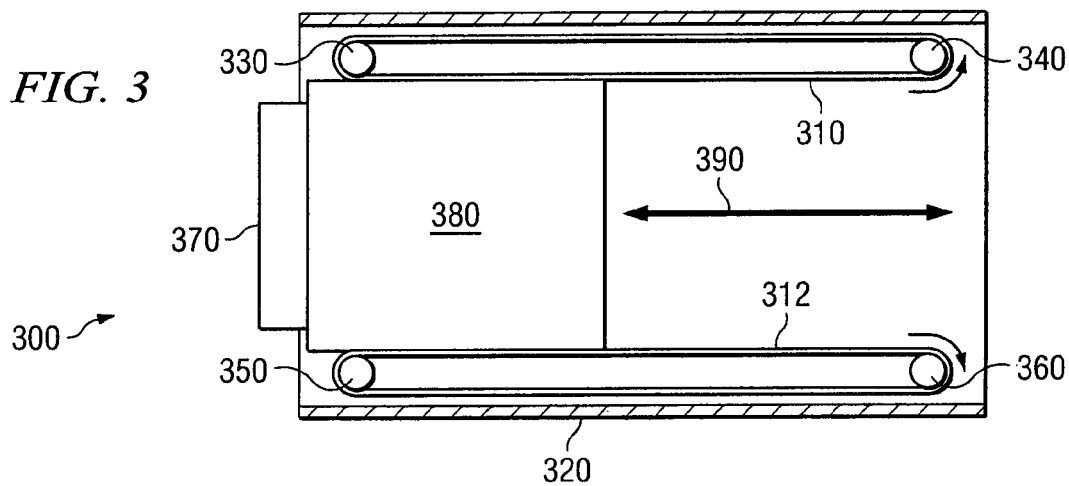
FIG. 3 shows a cross section of a device for manipulating multiple data storage cartridges in accordance with a preferred embodiment of the present invention.
Figure 4:
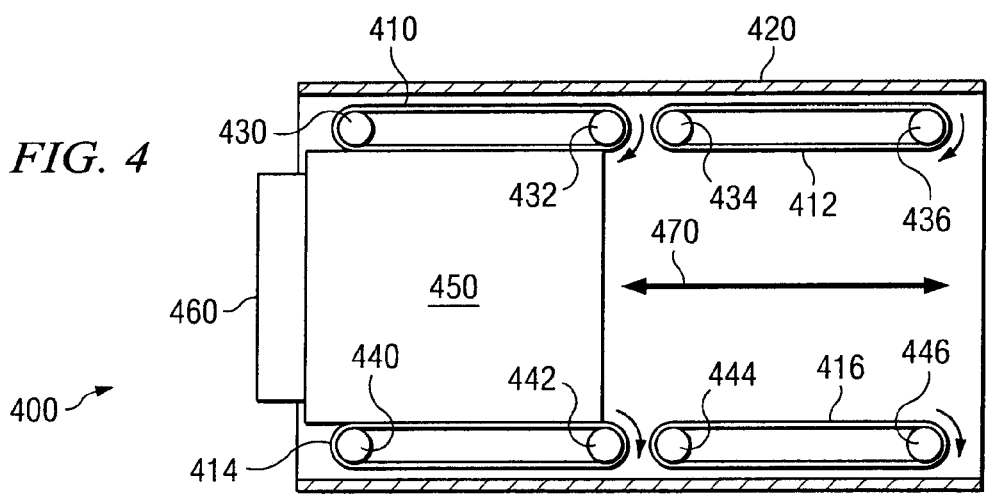
FIG. 4 shows a cross section of a device for manipulating multiple data storage cartridges in accordance with a preferred embodiment of the present invention.

FIG. 3 and FIG. 4 show two different transport mechanism and roller embodiments that may be implemented in the present invention. FIG. 3 shows a cross section of a device for manipulating multiple data storage cartridges in accordance with a preferred embodiment of the present invention. The transport mechanism and roller combinations shown for hand 300 in FIG. 3 are located on opposite inner walls of housing 320.

Hand 300 includes two transport mechanisms, such as transport mechanisms 310 and 312. Motors, or other actuators, operate in conjunction with rollers 330, 340, 350, and 360 to drive transport mechanisms 310 and 312. Rollers 330, 340, 350, and 360 are in an opposing relationship to each other. Rollers 330, 340, 350, and 360 and transport mechanisms 310 and 312 engage the sides of data storage cartridge 380 to move it from an opening in the front of housing 320 to the rear of housing 320. Rollers 330, 340, 350, and 360 and transport mechanisms 310 and 312 do not engage data storage cartridge 380 until gripping mechanism 370 moves at least a portion of data storage cartridge 380 into housing 320.

In the illustrative embodiment shown in FIG. 3, transport mechanisms 310 and 312 are disposed on opposite inner walls on the "sides" of hand 300. However, the transport mechanism and roller combinations shown in FIG. 3 may be disposed on opposite inner walls on the "top" and "bottom" of hand 300. The "side" walls and "top" and "bottom" walls of hand 300 are oriented perpendicular to each other. In either case, however, data storage cartridge 380 may be urged further into housing 320 along the direction indicated by arrows 390.

FIG. 4 shows a cross section of a device for manipulating multiple data storage cartridges in accordance with a preferred embodiment of the present invention. FIG. 4 shows another illustrative example of a belt and roller combination that may be implemented with the present invention. Hand 400 includes belts 410, 412, 414, and 416, arranged so that belts 410 and 412 are disposed along a first inner wall of housing 420 and belts 414 and 416 are disposed along a second inner wall of housing 420. The first and second inner walls are disposed opposite each other. Similarly, belt 410 is opposite belt 414 and belt 412 is opposite belt 416.

One or more motors, or other actuators, in conjunction with rollers 430, 432, 434, 436, 440, 442, 444, and 446, drive belts 410, 412, 414, and 416. Pairs of rollers are located on opposite ends of each belt. Belts 410 and 414 initially engage the sides of data storage cartridge 450 after the gripping mechanism 460 pulls data storage cartridge 450 into housing 420. Belts 412 and 416 engage data storage cartridge 450 after it passes belts 410 and 414 and rollers 432 and 442. Belts 412 and 416 pull data storage cartridge 450 further into housing 420 along the direction indicated by arrows 470.

In the illustrative embodiment shown in FIG. 4, belts 410 and 414 and 412 and 416 are disposed on opposite inner walls on the "sides" of hand 400.

However, one or both of the belt and roller combinations shown in FIG. 4 may be disposed on opposite inner walls on the "top" and "bottom" of hand 400. The "side" walls and "top" and "bottom" walls of hand 400 are oriented perpendicular to each other. In either case, data storage cartridge 450 may be urged further into housing 420 along the direction indicated by arrows 470.

In addition, a pair of opposite rollers may be disposed on the "top" and "bottom" of the inner walls of housing 420 and a second pair of opposite rollers may be disposed on opposing "sides" of the inner walls of housing 420. Thus, belt and roller systems may be arranged in a variety of configurations to manipulate data storage cartridge 450 advantageously within hand 400.

Figure 5:
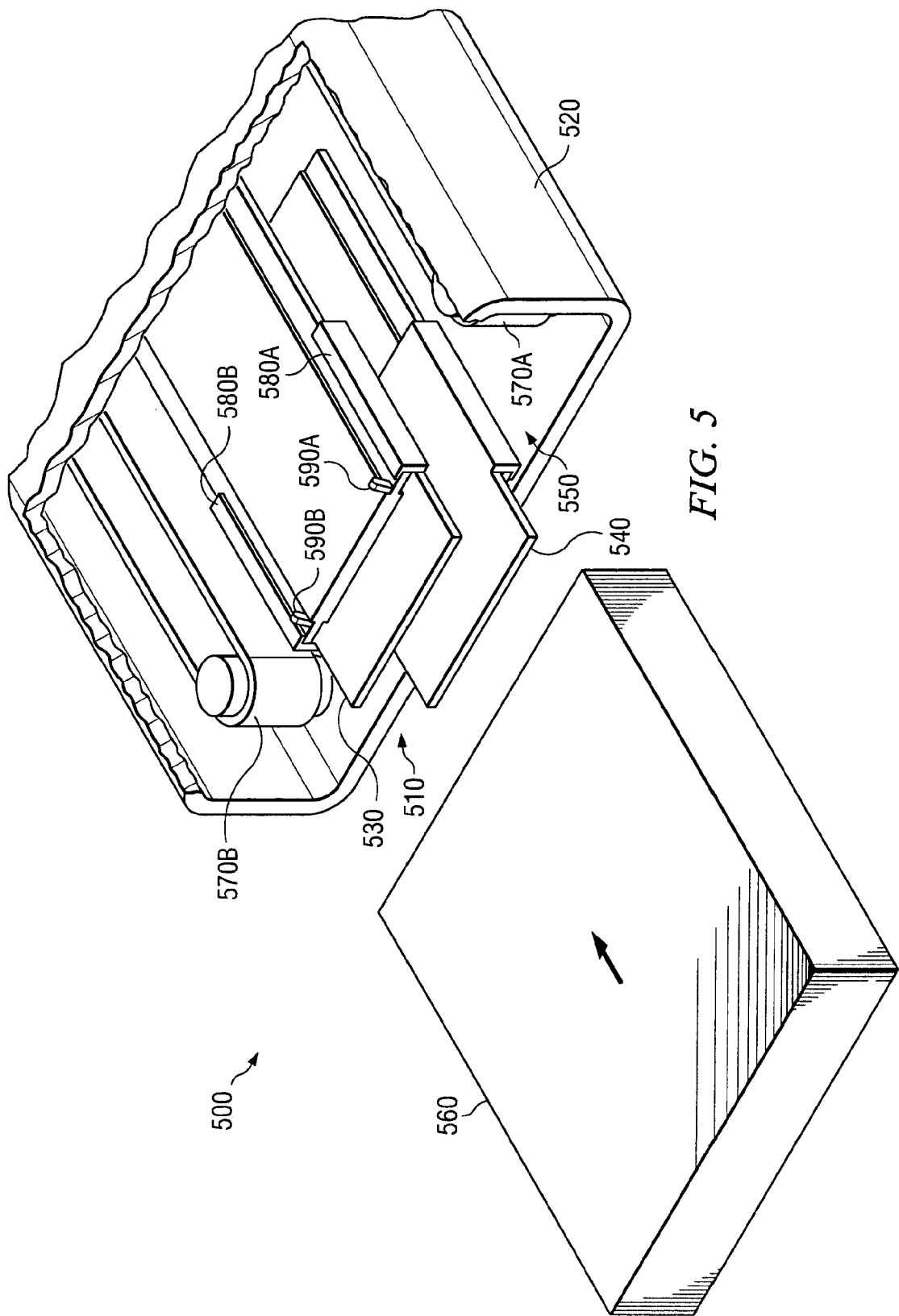
FIG. 5 shows a gripping mechanism for use with a device for manipulating multiple data storage cartridges in accordance with a preferred embodiment of the present invention.

FIG. 5 shows a gripping mechanism for use with a device for manipulating multiple data storage cartridges in accordance with a preferred embodiment of the present invention. Hand 500 includes a gripping mechanism 510 recessed within housing 520. Gripping mechanism 510 includes two tongs, tong A 530 and tong B 540, which move in and out of opening 550 in housing 520. Tong A 530 and tong B 540 clamp data storage cartridge 560 securely before data storage cartridge 560 is fully placed into or out of opening 550 in housing 520. Primary belt and roller set 570A and 570B urges data storage cartridge 560 further into housing 520 through opening 550. The action of primary belt and roller set 570A and 570B may be reversed such that data storage cartridge 560 is urged outwardly through opening 550.

Gripping mechanism 510 further includes rails 580A and 580B, to which tong A 530 is operably attached. Tong A 530 slides along rails 580A and 580B. In addition, rails 580A and 580B are operably attached to the inner wall of housing 520 via links 590A and 590B. Links 590A and 590B allow tong A 530 to swing back and forth slightly relative to the long axis of hand 500. Thus, tong A 530 may slide along rails 580A and 580B and swing along the long axis of hand 500. A similar set of rails and links are attached to tong B 540 and the opposite inner wall of housing 520.

The rails and links shown in FIG. 5 are each attached to one or more actuators, which may be independently operable. Thus, in one illustrative embodiment, the rails may swing outwardly and inwardly relative to opening 550, actuated by a solenoid or other actuator. At the same time, the tongs slide along the rails outwardly relative to opening 550, actuated by a motor. As the rails swing outwardly, the vertical position of the rails relative to housing 520 changes. This motion causes each set of rails to move closer to the other. As a result, the tongs are urged together to grip data storage cartridge 560. Similarly, as data storage cartridge 560 is moved into housing 520, the rails eventually swing inwardly relative to opening 550. This motion causes each set of rails ultimately to move away from the other. As a result, the tongs are urged apart to release data storage cartridge 560 inside housing 520. When data storage cartridge 560 is sufficiently within housing 520, one or more belt and roller systems, such as belt and roller system 570A and 570B, further handle data storage cartridge 560.

Figure 6A:
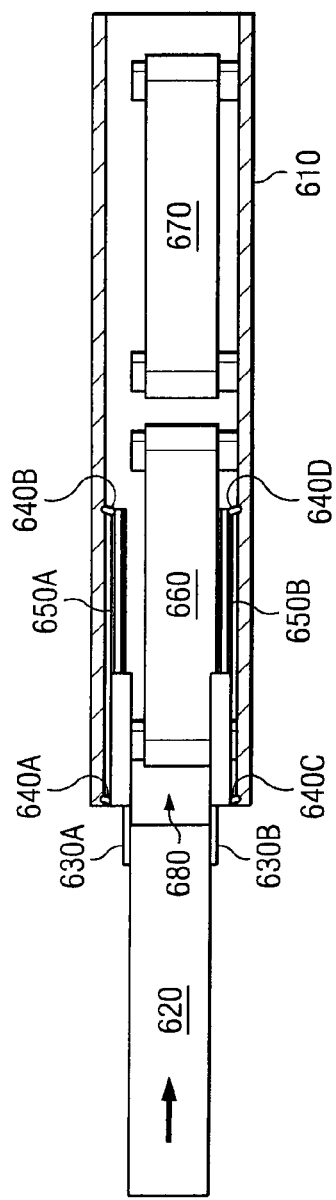
FIG. 6A shows a cross section of the gripping mechanism shown in FIG. 5 in accordance with a preferred embodiment of the present invention.
Figure 6B:
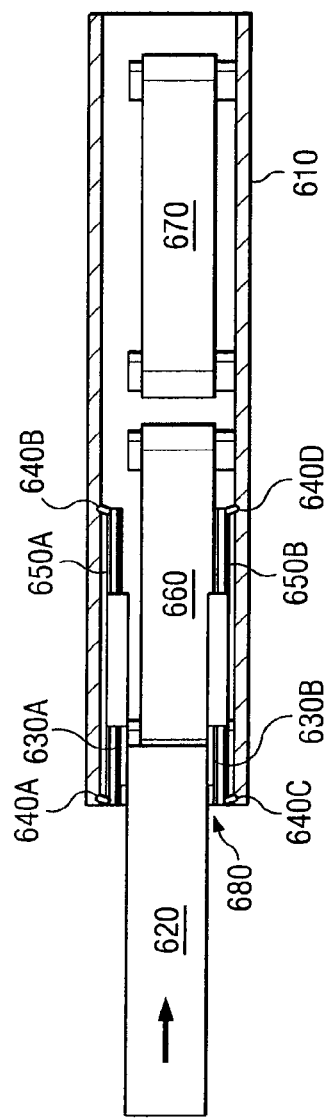
FIG. 6B shows a cross section of the gripping mechanism shown in FIG. 5 in accordance with a preferred embodiment of the present invention.
Figure 6C:
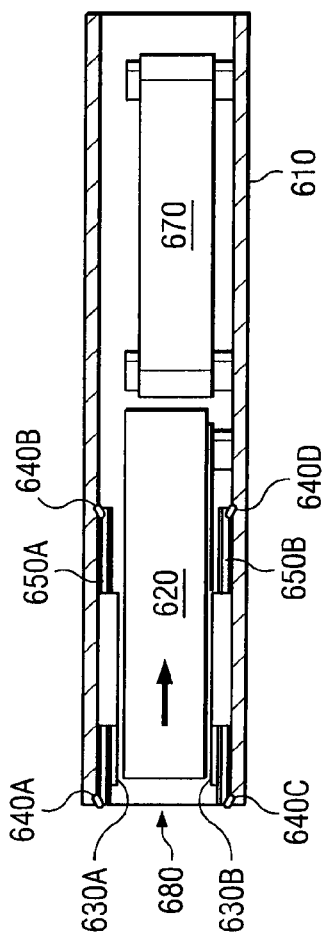
FIG. 6C shows a cross section of the gripping mechanism shown in FIG. 5 in accordance with a preferred embodiment of the present invention.

FIG. 6A through FIG. 6C illustrate operation of the tongs, rails, and links shown in FIG. 5. FIG. 6A shows a cross section of the gripping mechanism shown in FIG. 5 in accordance with a preferred embodiment of the present invention. Hand 600 includes a housing 610 into which data storage cartridge 620 is to be moved. In use, tong A 630A and tong B 630B are pushed outwardly relative to opening 680. Tong A 630A and tong B 630B move along rail A 650A and rail B 650B, respectively. The tongs are actuated by a motor, hydraulic piston, or other actuator.

Rail A 650A is attached to housing 610 via link A 640A and link B 640B. Rail B 650B is attached to housing opposite Rail A 650A via link C 640C and link D 640D. Tong A 630A and tong B 630B are moved along the rails, actuated by a solenoid, motor, piston, or other actuator disposed near the rear of hand 600. The rear of hand 600 is disposed opposite opening 680. In the illustrative embodiment shown in FIG. 6A, links 640A, 640B, 640C, and 640D are adapted such that rails 650A and 650B swing freely along the major axis of housing 610, which is the axis connecting opening 680 with the rear of housing 610.

Initially, tongs 630A and 630B are driven outwardly along rails 650A and 650B, actuated by a motor or other actuator. At the same time, rails 650A and 650B swing outwardly, actuated by a solenoid or other actuator. Thus, tongs 630A and 630B also swing outwardly. As tongs 630A and 630B swing outwardly, rails 650A and 650B move closer together. As a result, the outwardly extending portions of tongs 630A and 630B grip data storage cartridge 620. At this point, data storage cartridge 620 is ready to be moved into housing 610.

FIG. 6B shows a cross section of the gripping mechanism shown in FIG. 5 in accordance with a preferred embodiment of the present invention. Once storage cartridge 620 is ready to be moved into housing 610, tongs 630A and 630B are pulled inwardly relative to opening 680. Simultaneously, rails 650A and 650B swing inwardly. Thus, data storage cartridge 620 is pinched between tongs 630A and 630B and pulled into housing 610 until belt and roller system 660 engages data storage cartridge 620.

FIG. 6C shows a cross section of the gripping mechanism shown in FIG. 5 in accordance with a preferred embodiment of the present invention. Once belt and roller system 660 engages data storage cartridge 620, the belt and roller system fully draws data storage cartridge 620 into housing 610. As data storage cartridge is pulled into housing 610, rails 650A and 650B are pushed outwardly until the distance between rails 650A and 650A increases. Eventually, the distance between rails 650A and 650B increases to the point where tongs 630A and 630B release data storage cartridge 620. At this point, data storage cartridge 620 is fully engaged by hand 600.

In the illustrative embodiment described above, the rails are designed to move in and out only enough to cause the tongs to grip or release the cartridge in the manner described above. However, in other embodiments, the rails may be designed to move in and out further while the tongs grip the cartridge.

Thereafter, belt and roller system 660 continues to draw data storage cartridge 620 further rearwardly relative to opening 680. Eventually, second belt and roller system 670 engages data storage cartridge 620. Second belt and roller system then continues to draw data storage cartridge 620 rearwardly until data storage cartridge 620 reaches the rear portion of housing 610. The process described in relation to FIG. 6A through FIG. 6C may be reversed in order to eject a data storage cartridge from hand 600.

The hand shown in FIG. 5 through FIG. 6C may be varied. A variety of actuators and linkages may be used to actuate the rails and the tongs. In addition, the size and dimensions of the hand, housing, tongs, rails, belts, rollers, and other components may be varied to accommodate differently sized data storage cartridges. Furthermore, the hand may be attached to a variety of different robots such that the hand may be used in a variety of data storage libraries. In addition, the hand may be expanded to accommodate two-dimensional or three-dimensional arrays of data storage cartridges within the hand.

In addition, the tongs may be replaced by resilient flaps fixedly attached to the hand and extending from the opening in the hand. In this case, the entire hand is moved forward to force the flaps over the cartridge to be retrieved. The flaps grip the cartridge and the cartridge is drawn further into the hand using mechanisms such as those described above. The cartridge may be ejected by means of any suitable mechanism, such as a rod and piston assembly. Ejection may be further aided in this illustrative embodiment with an actuator disposed within a cartridge holder or cartridge reader adapted to draw the cartridge into the holder or the reader.

The inventions described herein provide several advantages over currently known hands or devices for data storage cartridge manipulation. Known hands can only accommodate one data storage cartridge at a time. Thus, an aisle must be placed between each row of data storage cartridges. Each aisle wastes space that could be used to hold data storage cartridge. Using the hand of the present invention, rows and columns of data storage cartridges may abut each other, because the hand of the present invention can retrieve data storage cartridges located two or more rows or columns behind a data storage cartridge adjacent to an aisle. Furthermore, fewer robots are required to manipulate data storage cartridges, thereby saving cost. Thus, the hand of the present invention saves space in a data storage library and reduces the cost of building and maintaining the data storage library.

The description of the above embodiments has been presented for purposes of illustration and description, and is not intended to be exhaustive or limiting. Many modifications and variations will be apparent to those of ordinary skill in the art. For example, the hand may be adapted to manipulate other storage elements, such as floppy disks, hard drives, CDs, DVDs, external memory chips, and other storage elements.

What is claimed is:

1. A method of manipulating a data storage cartridge, the method comprising:
    retrieving a first data storage cartridge from a storage compartment using a device, wherein the device comprises:
        a housing sized and dimensioned to hold a plurality of data storage cartridges, the housing adapted to be operable with a robot, the robot adapted to move the housing to a plurality of locations within a library of data storage cartridges such that an opening in the housing may be aligned with the data storage cartridges in the library;
        a gripping mechanism extending from the opening in the housing, the gripping mechanism operably attached to the housing and adapted to grip the first data storage cartridge when the first data storage cartridge is disposed outside the housing, wherein the gripping mechanism is further adapted to pull the first data storage cartridge into the opening; and
        a first transport mechanism disposed within and operably connected to the housing, the first transport mechanism adapted to pull the first data storage cartridge away from the gripping mechanism and further into the housing through the opening as the first data storage cartridge comes into contact with the first transport mechanism.

2. The method of claim 1 further comprising pulling the first data storage cartridge within the housing by drawing the first data storage cartridge into the housing using the first transport mechanism.

3. The method of claim 1 further comprising ejecting the first data storage cartridge into a first data storage cartridge reader after retrieving the first data storage cartridge.

4. The method of claim 1 further comprising retrieving a second data storage cartridge from a second storage compartment using the device.

5. The method of claim 1 further comprising ejecting the first data storage cartridge into a second storage compartment after retrieving the first data storage cartridge.

6. The method of claim 1 wherein the gripping mechanism comprises a first rail operably connected to a first inner wall of the housing, the first rail being operable to swing a predetermined distance along a first axis of the housing; a second rail operably connected to a second inner wall of the housing and spaced away from the first rail, the second rail being operable to swing the predetermined distance along the first axis of the housing; a first tong operably connected to the first rail, the first tong being operable to move along the first rail; a second tong operably connected to the second rail, the second tong being operable to move along the second rail; wherein the first data storage cartridge may be gripped between the first tong and the second tong when the first and second tongs extend from the opening in the housing; and wherein the step of retrieving the first data storage cartridge includes:
    receiving the first data storage cartridge between the first tong and the second tong;
    causing the first rail and the second rail to swing inwardly towards the housing;
    causing the first tong to move inwardly along the first rail toward the housing and causing the second tong to move inwardly along the second rail toward the housing; and
    gripping the first data storage cartridge between the first tong and the second tong.

7. The method of claim 6 further comprising drawing the first data storage cartridge further into the housing using the first transport mechanism.

8. The method of claim 6 further comprising:
causing the first rail and the second rail to swing outwardly away from the housing;
causing the first tong to move outwardly along the first rail away from the housing and causing the second tong to move outwardly along the second rail away from the housing; and
releasing the first data storage cartridge from between the first tong and the second tong.

9. The method of claim 1 wherein the device further comprises the robot and wherein the method further comprises moving the first data storage cartridge from the storage compartment to a second location, wherein the step of moving is performed using the robot.

10. The method of claim 1 wherein the housing of the device includes a first axis along which the first data storage cartridge may be retrieved through the opening, and wherein the housing is further sized and dimensioned to hold a second data storage cartridge such that the first data storage cartridge and the second data storage cartridge may be held in a stack along a second axis of the housing, and wherein the method further includes:
drawing the first data storage cartridge into the housing;
retrieving the second data storage cartridge;
drawing the second data storage cartridge into the housing; and
manipulating the second data storage cartridge within the housing such that the first data storage cartridge may be ejected before the second data storage cartridge is ejected.

11. The method of claim 1 wherein the gripping mechanism is configured to reciprocate back and forth with respect to the housing.

12. The method of claim 1 wherein the first transport mechanism includes a belt and multiple rollers.

13. The method of claim 1 further comprising retrieving a second data storage cartridge from a second storage compartment using the device while the first data storage cartridge is held in the housing, such that the first data storage cartridge and the second data storage cartridge are held in a line along a first axis of the housing that extends through the opening.

14. The method of claim 6 wherein the rails move away from each other as the rails swing inwardly with respect to the housing.

15. A method of manipulating a data storage element, the method comprising:
gripping the data storage element, while the data storage element is disposed in a storage compartment, using a gripping mechanism that extends from an opening in a housing, wherein the gripping mechanism is operably attached to the housing, and wherein the housing is sized to hold a plurality of data storage elements;
moving the data storage element away from the storage compartment and into the opening using the gripping mechanism; and
moving the data storage element away from the gripping mechanism and further into the housing through the opening using a first transport mechanism, the first transport mechanism being disposed within and operably connected to the housing.

16. The method of claim 15 further comprising moving the data storage element still further into the housing and away from the first transport mechanism using a second transport mechanism disposed within and operably connected to the housing, the second transport mechanism being disposed adjacent the first transport mechanism; and receiving an additional data storage element through the opening while the data storage element is held in the housing, such that the data storage element and the additional data storage element are held in a line along a first axis of the housing that extends through the opening.

17. The method of claim 15 wherein the gripping mechanism comprises a first rail operably connected to a first inner wall of the housing, the first rail being operable to swing a predetermined distance along a first axis of the housing; a second rail operably connected to a second inner wall of the housing and spaced away from the first rail, the second rail being operable to swing the predetermined distance along the first axis of the housing; a first tong operably connected to the first rail and movable along the first rail; and a second tong operably connected to the second rail and movable along the second rail; wherein the first data storage element may be gripped between the first tong and the second tong when the first and second tongs extend from the opening in the housing; and wherein gripping the data storage element comprises:
swinging the rails and tongs outwardly so that the tongs grip the data storage element.

18. The method of claim 17 wherein moving the data storage element away from the storage compartment comprises:
swinging the rails inwardly toward the housing; and
moving the first and second tongs inwardly toward the housing along the first and second rails, respectively.

* * * * *